(12) United States Patent
Fujikawa

(10) Patent No.: US 11,829,837 B2
(45) Date of Patent: Nov. 28, 2023

(54) SYMBOL EVALUATION DEVICE AND EVALUATION METHOD

(71) Applicant: OMRON Corporation, Kyoto (JP)

(72) Inventor: Masahiro Fujikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 162 days.

(21) Appl. No.: 17/439,397

(22) PCT Filed: Apr. 1, 2020

(86) PCT No.: PCT/JP2020/015043
§ 371 (c)(1),
(2) Date: Sep. 14, 2021

(87) PCT Pub. No.: WO2020/204078
PCT Pub. Date: Oct. 8, 2020

(65) Prior Publication Data
US 2022/0188534 A1     Jun. 16, 2022

(30) Foreign Application Priority Data
Apr. 5, 2019   (JP) ................. 2019-072973

(51) Int. Cl.
G06K 7/14     (2006.01)
H04N 19/124   (2014.01)
H04N 19/186   (2014.01)

(52) U.S. Cl.
CPC ......... *G06K 7/1473* (2013.01); *G06K 7/1417* (2013.01); *G06K 7/1495* (2013.01); *H04N 19/124* (2014.11); *H04N 19/186* (2014.11)

(58) Field of Classification Search
CPC .. G06K 7/1473; G06K 7/1417; G06K 7/1495; G06K 7/146; H04N 19/124; H04N 19/186
See application file for complete search history.

(56) References Cited

U.S. PATENT DOCUMENTS

2012/0248191 A1* 10/2012 Kitagawa ............... G06K 7/146
235/462.22

FOREIGN PATENT DOCUMENTS

| JP | 2004054530 | 2/2004 |
| JP | 2009204396 | 9/2009 |

(Continued)

OTHER PUBLICATIONS

ISO/IEC 15415:2011, "Information technology—Automatic identification and data capture techniques—Bar code symbol print quality test specification—Two-dimensional symbols," International Standard, Dec. 2011, pp. 1-52.

(Continued)

*Primary Examiner* — Matthew Mikels
(74) *Attorney, Agent, or Firm* — JCIPRNET

(57) ABSTRACT

In evaluation of the print quality of a symbol, the evaluation processing takes time. A symbol evaluation device (5) includes: a decoding unit (52) that decodes a symbol included in an image and thereby identifies reference position information of the symbol; a module position identification unit (53) that identifies a plurality of module positions included in the symbol on the basis of the reference position information of the symbol identified by the decoding unit; and a quality evaluation unit (54) that evaluates the quality of the symbol on the basis of the plurality of module positions identified by the module position identification unit.

15 Claims, 11 Drawing Sheets

(56) References Cited

FOREIGN PATENT DOCUMENTS

| | | |
|---|---|---|
| JP | 2013037559 | 2/2013 |
| JP | 2015232873 | 12/2015 |
| JP | 2016105276 | 6/2016 |
| JP | 2016540329 | 12/2016 |
| JP | 2017532670 | 11/2017 |

OTHER PUBLICATIONS

"Search Report of Europe Counterpart Application", dated Nov. 2, 2022, p. 1-p. 5.
"Search Report of Europe Counterpart Application", dated Feb. 11, 2022, p. 1-p. 5.
"International Search Report (Form PCT/ISA/210) of PCT/JP2020/015043," dated Jun. 30, 2020, with English translation thereof, pp. 1-4.
"Written Opinion of the International Searching Authority (Form PCT/ISA/237) of PCT/JP2020/015043," dated Jun. 30, 2020, with English translation thereof, pp. 1-6.
"Office Action of Japan Counterpart Application", dated Feb. 8, 2022, with English translation thereof, p. 1-p. 10.

\* cited by examiner (a)

A1

(b)

B1, C2, B3, C1, B2, D1

(a)

(b)

(c)

(d)

SYMBOL EVALUATION DEVICE AND EVALUATION METHOD

CROSS-REFERENCE TO RELATED APPLICATION

This application is a 371 application of the International PCT application serial no. PCT/JP2020/015043, filed on Apr. 1, 2020, which claims the priority benefits of Japan Patent Application No. 2019-072973, filed on Apr. 5, 2019. The entirety of each of the above-mentioned patent applications is hereby incorporated by reference herein and made a part of this specification.

BACKGROUND

Technical Field

The present invention relates to an evaluation device and an evaluation method for a symbol included in an image.

Related Art

A symbol having information such as a one-dimensional symbol, a two-dimensional symbol, or the like is used for identification, management and the like of an article.

There is a verifier that evaluates the print quality of this symbol. This verifier evaluates the print quality of a symbol conforming to a method specified by ISO/IEC corresponding to each symbol, as described in Patent literature 1, for example.

LITERATURE OF RELATED ART

Patent Literature

Patent literature 1: Japanese Patent Laid-Open No. 2009-204396 (published on Sep. 10, 2009)

SUMMARY

Problems to be Solved

In a two-dimensional symbol, a position detection pattern in the symbol is first found to identify a position of the symbol, then a center coordinate of a grid is obtained, and the print quality of the symbol is evaluated according to a method specified by ISO/IEC 15415. For example, as shown in FIG. 3(*a*), in a data matrix, the symbol position detection pattern is an L-shape consisting of a left side and a lower side of a square symbol. As shown in FIG. 3(*b*), in a QR code (registered trademark), the symbol position detection pattern is a pattern in which dark-bright-dark-bright-dark=1:1:3:1:1 along a vertical axis or a horizontal axis. In the two-dimensional symbol, first, positions of these symbol position detection patterns are identified, and then the entire grid is binarized and read.

However, in recent years, due to the expansion of traceability, symbols are printed on everything and everywhere, and the number of objects for individual management is increasing. When a symbol used for individual management cannot be read, even if there is no problem with the product quality, the product is discarded in the worst case. Thus, there is a growing demand to carry out a symbol print quality inspection in addition to a symbol reading inspection for all the objects for individual management flowing on a production line. When the objects for individual management are small, the inspection time for one object allowed on the production line tends to be short. However, in a print quality verification specified by ISO/IEC, it takes time to identify a position of each module, particularly to find a position detection pattern of a symbol, and thus it is impossible to verify all of the objects. Thus, it is desirable to enable quality inspection in a short time while maintaining a high correlation with a quality verification result of a verifier. That is, an inspection machine is required to perform a relative evaluation that has a high correlation with the verifier, rather than an absolute evaluation required by the verifier.

In view of the above problems, one aspect of the present invention aims to realize a technique that can shorten the processing time required for quality evaluation in an inspection machine in terms of quality evaluation of printing of a symbol.

Means to Solve Problems

In order to solve the above problems, a symbol evaluation device according to one aspect of the present invention includes: a decoding unit that decodes a symbol included in an image and thereby identifies reference position information of the symbol; a module position identification unit that identifies a plurality of module positions included in the symbol on the basis of the reference position information of the symbol identified by the decoding unit; and a quality evaluation unit that evaluates the quality of the symbol on the basis of the plurality of module positions identified by the module position identification unit.

In addition, a symbol evaluation method according to one aspect of the present invention includes: a decoding step of decoding a symbol included in an image and thereby identifying reference position information of the symbol; a module position identification step of identifying a plurality of module positions included in the symbol on the basis of the reference position information of the symbol identified in the decoding step; and a quality evaluation step of evaluating the quality of the symbol on the basis of the plurality of module positions identified in the module position identification step.

Effect

According to one aspect of the present invention, the processing time required for evaluating the print quality of a symbol can be shortened.

Figure 3:
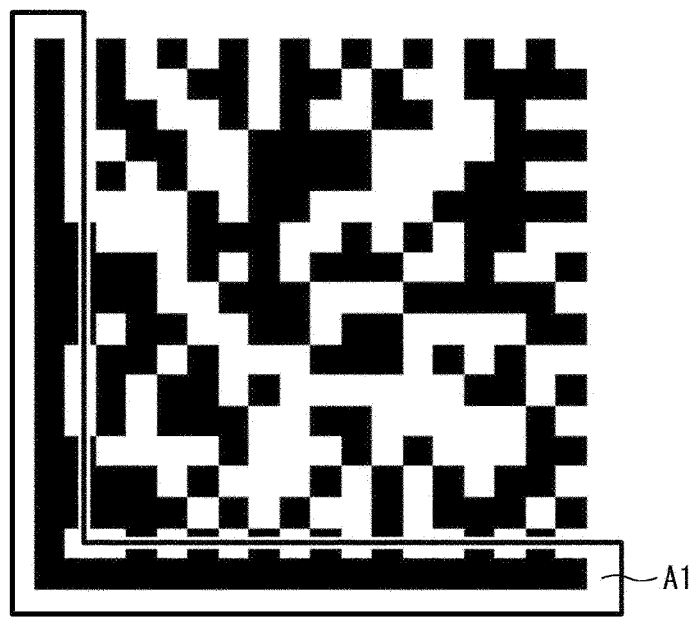
Figure 3:
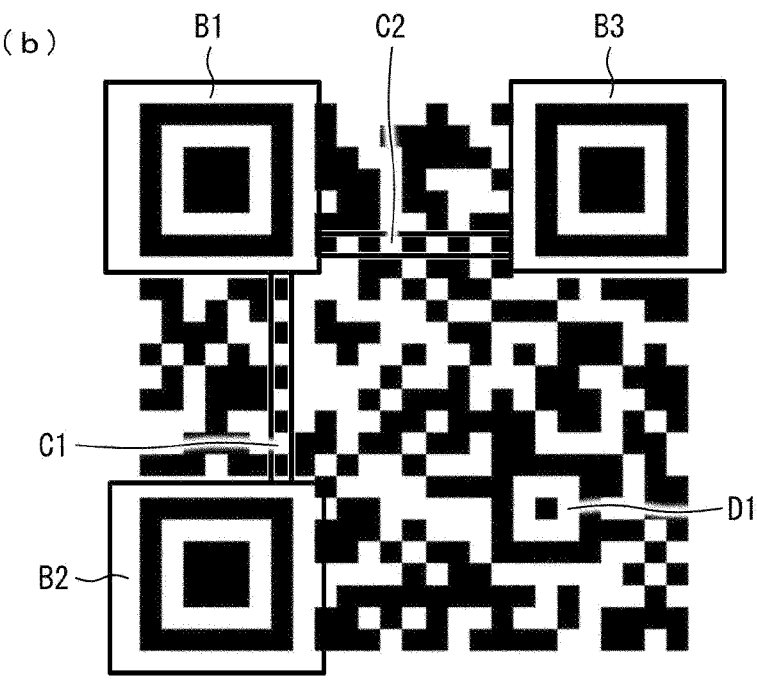

(a) of FIG. 3 and (b) of FIG. 3 are examples of a two-dimensional symbol, (a) of FIG. 3 shows a data matrix, and (b) of FIG. 3 shows a QR code.

Figure 4:
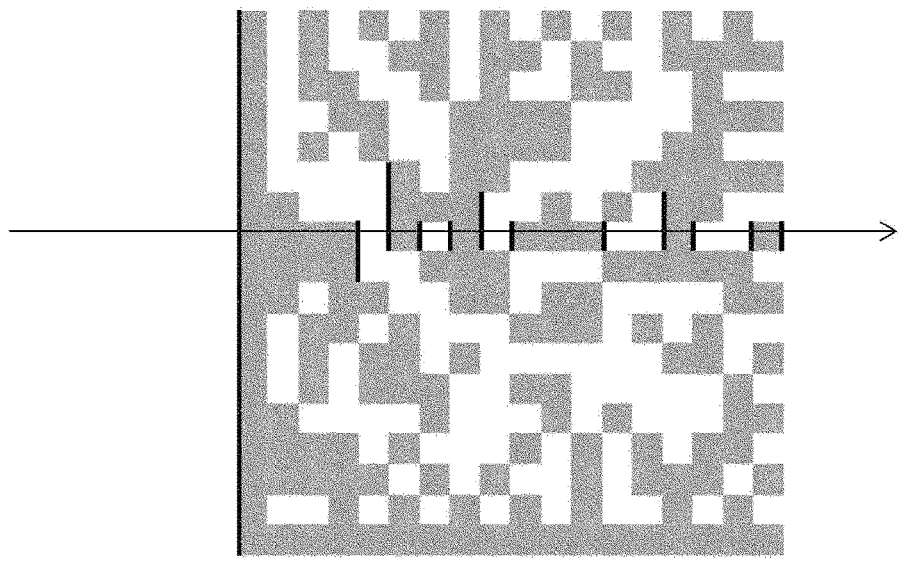

FIG. 4 is a diagram illustrating a method for finding a symbol position detection pattern according to a reference example.

Figure 5:
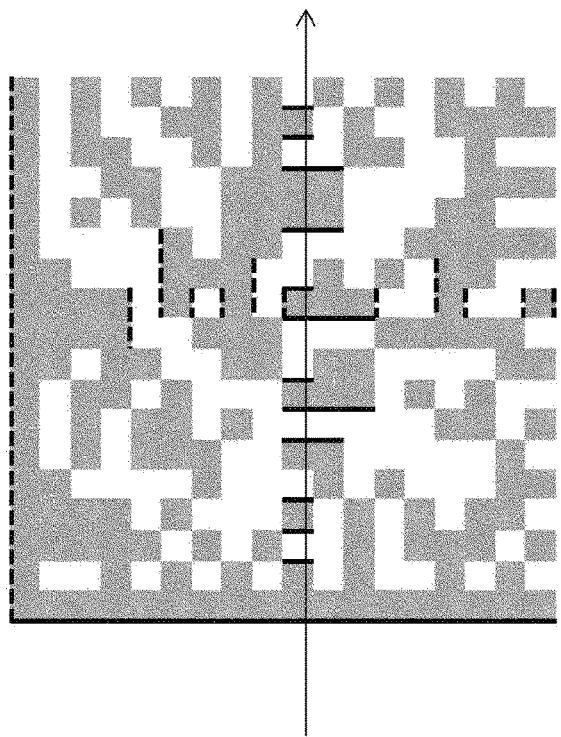

FIG. 5 is a diagram illustrating a method for finding a symbol position detection pattern according to a reference example.

Figure 6:
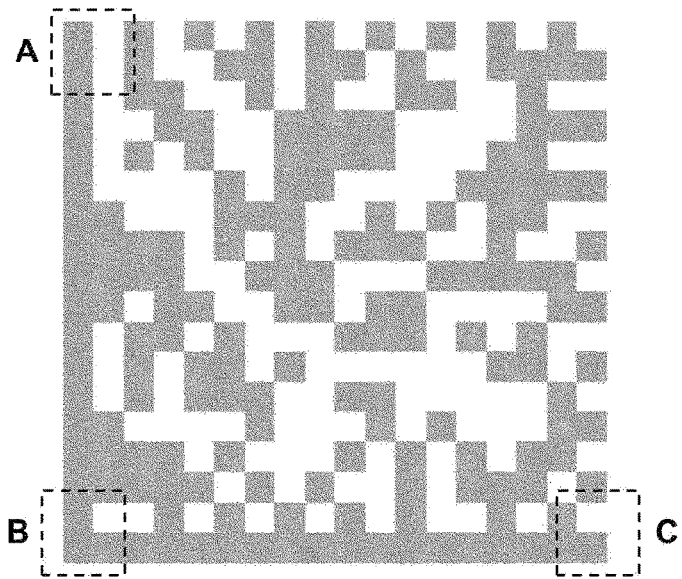
Figure 6:
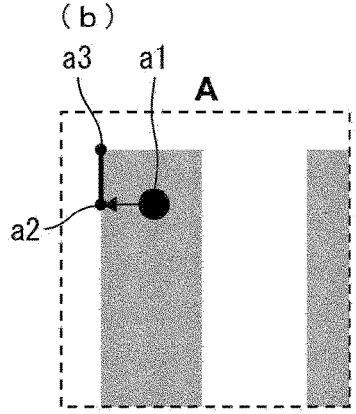
Figure 6:
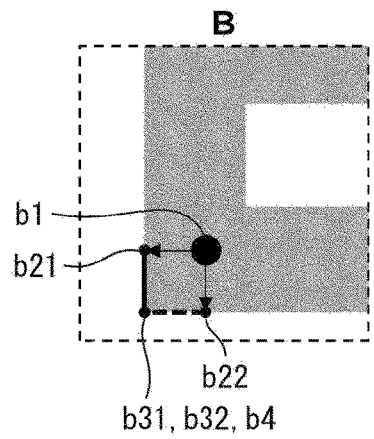
Figure 6:
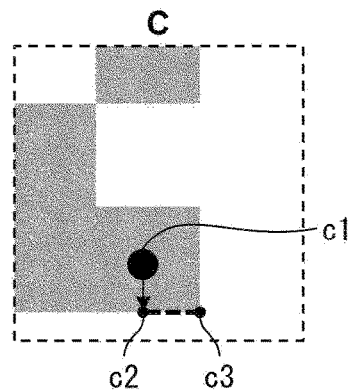

(a) of FIG. 6 to (d) of FIG. 6 are diagrams illustrating a method for finding a reference position of a symbol position detection pattern according to the embodiment of the present invention.

Figure 7:
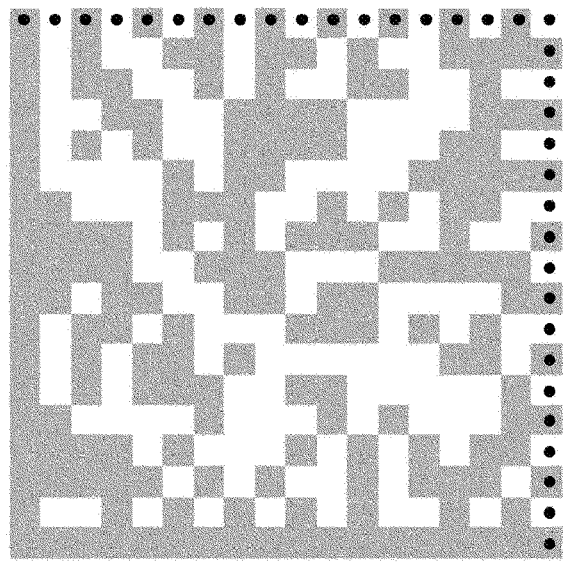

FIG. 7 is a diagram illustrating a method for finding a reference position of a module position detection pattern according to the embodiment of the present invention.

Figure 8:
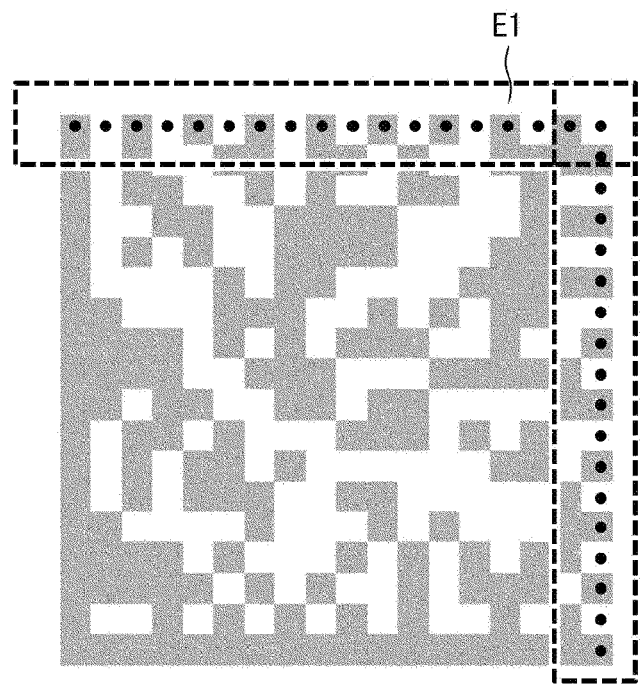

FIG. 8 is a diagram illustrating a method for finding a reference position of the module position detection pattern according to the embodiment of the present invention.

Figure 9:
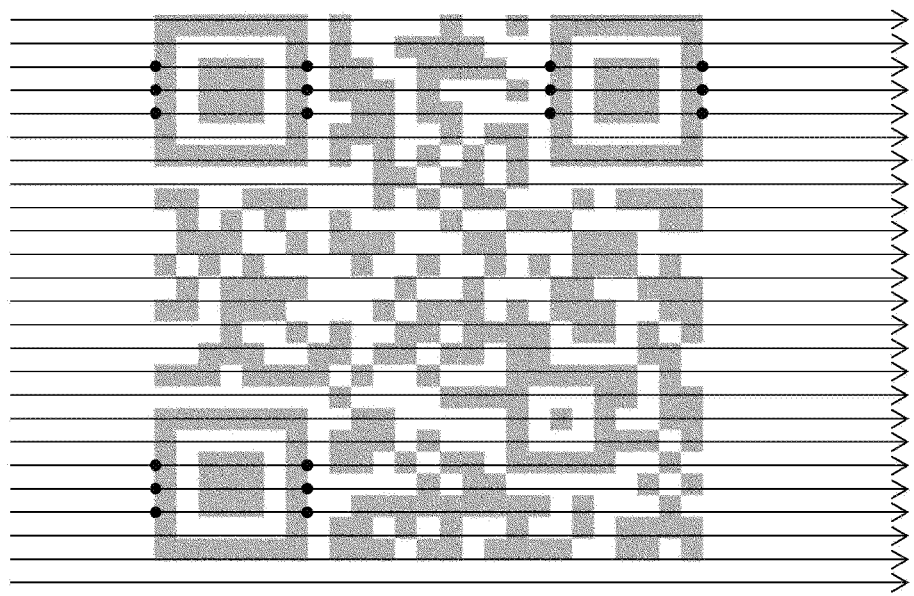

FIG. 9 is a diagram illustrating a method for finding a symbol position detection pattern according to a reference example.

Figure 10:
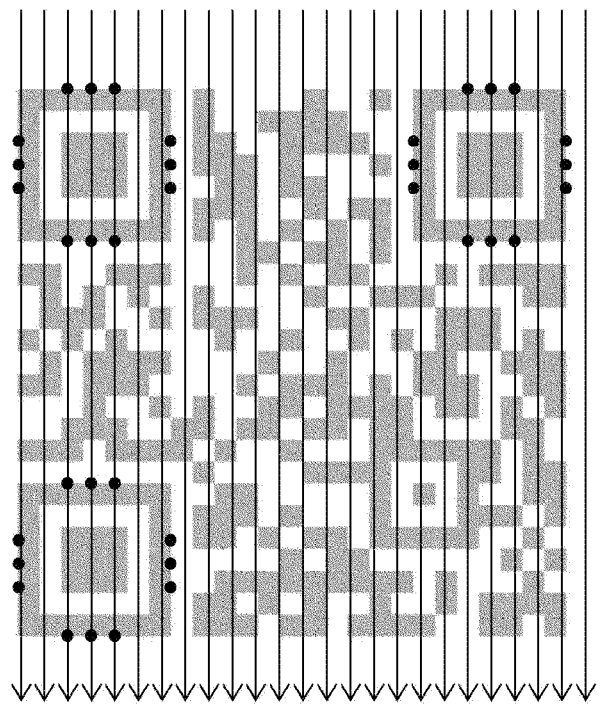

FIG. 10 is a diagram illustrating a method for finding a symbol position detection pattern according to a reference example.

Figure 11:
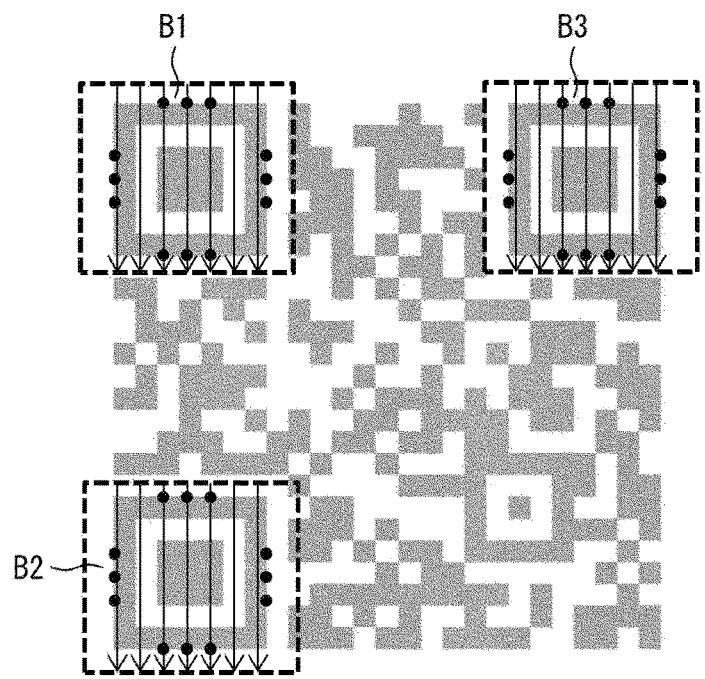

FIG. 11 is a diagram illustrating a method for finding a reference position of a symbol position detection pattern according to another embodiment of the present invention.

Figure 12:
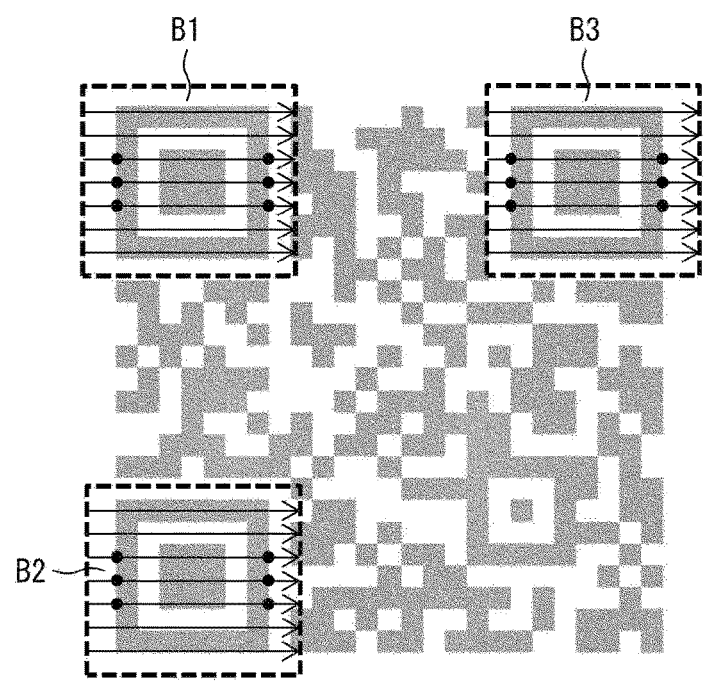

FIG. 12 is a diagram illustrating a method for finding a reference position of a symbol position detection pattern according to another embodiment of the present invention.

Figure 13:
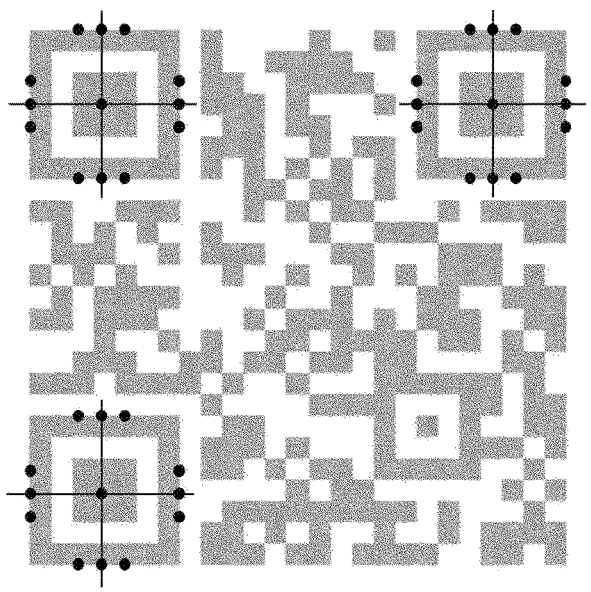

FIG. 13 is a diagram showing a reference position of a symbol position detection pattern according to another embodiment of the present invention.

Figure 14:
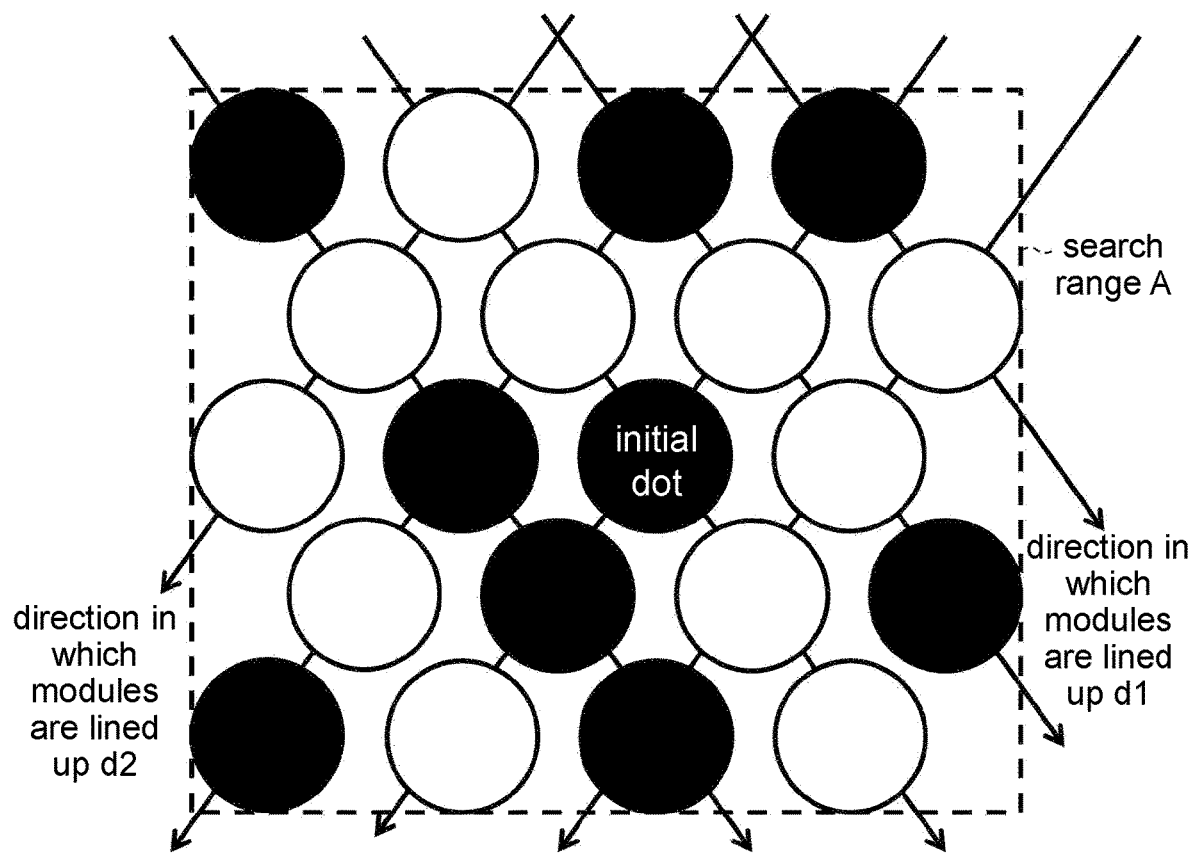

FIG. 14 is a diagram showing a symbol applied to still another embodiment of the present invention.

Figure 15:
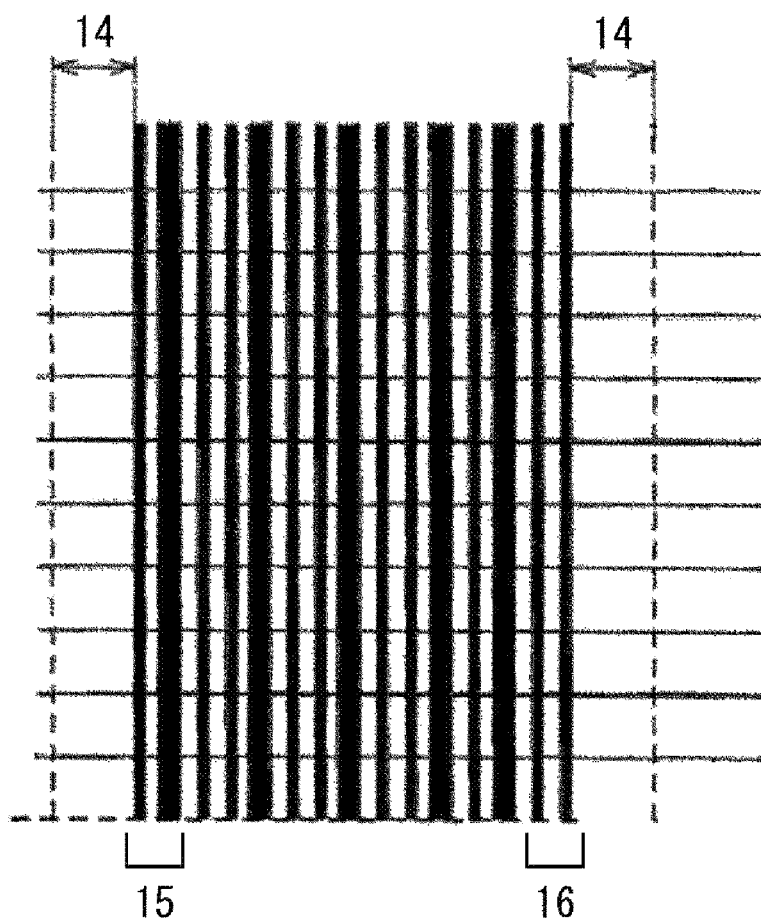

FIG. 15 is a diagram showing a symbol applied to still another embodiment of the present invention.

Figure 16:
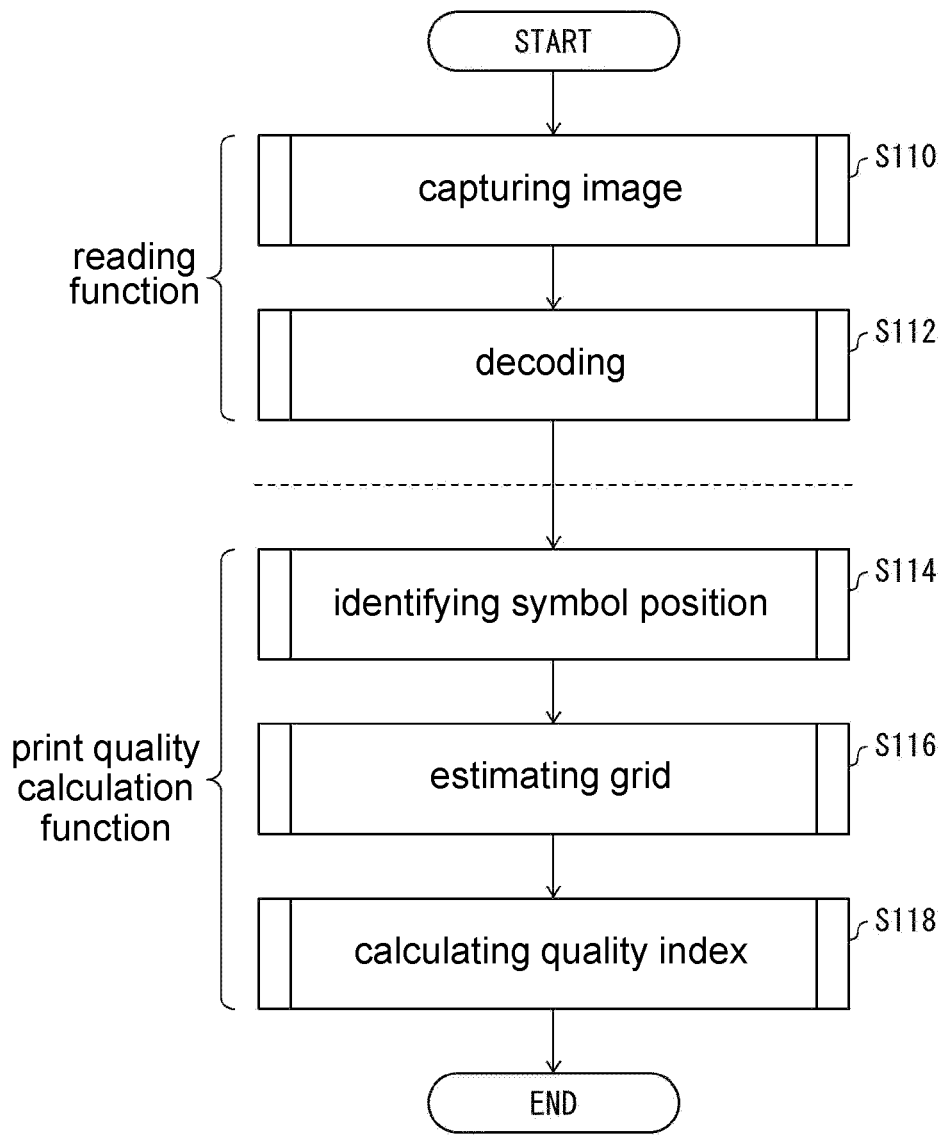

FIG. 16 is a flowchart showing an example of a flow of processing of symbol print evaluation according to a conventional technique.

DESCRIPTION OF THE EMBODIMENTS

Hereinafter, embodiments according to one aspect of the present invention (hereinafter, also referred to as "the embodiment") are described with reference to the drawings.

§ 1 Application Example

FIG. 3 is an example of a two-dimensional symbol applied to a symbol evaluation device according to the embodiment, FIG. 3(a) shows a data matrix, and FIG. 3(b) shows a QR code. Each symbol includes a pattern for detecting a position of the symbol (hereinafter, referred to as "symbol position detection pattern") according to the type of the symbol. For example, the symbol position detection pattern is an L-shaped pattern A1 consisting of dark color modules extending on a lower side and a left side of a square symbol in the data matrix of FIG. 3(a), and the symbol position detection patterns are three square patterns B1 to B3 respectively located at an upper right vertex, an upper left vertex, and a lower left vertex of a square symbol in the QR code of FIG. 3(b).

When the print quality of the symbol is measured, first, the symbol position detection pattern is found, and thereby a position (range) of the symbol is identified. Then, on the basis of the identified position of the symbol, a position of each module constituting the symbol is identified.

As a reference example, an outline of a symbol quality evaluation method specified by ISO/IEC is described. For example, in a case of the data matrix, an image including the symbol is binarized by a method conforming to ISO/IEC 15415, and positions of all the modules included in the symbol are identified by a method conforming to ISO/IEC 16022. Then, the print quality of the symbol is measured (evaluated) according to the method specified by ISO/IEC 15415.

FIGS. 4 and 5 show a method for detecting a symbol position detection pattern in a data matrix specified by ISO/IEC 16022. With reference to these drawings, the method for detecting the symbol position detection pattern in the data matrix is described below.

First, an image including the entire symbol is binarized using the method specified by ISO/IEC 15415. Next, as shown in FIG. 4, a center of the image is scanned in a horizontal direction to detect color change points (white to black, and black to white), and an edge including the detected change points is traced. Next, as shown in FIG. 5, this time, the center of the image is scanned in a vertical direction to detect color change points (white to black, and black to white), and an edge including the detected change points is traced. Then, on the basis of a combination of the detected vertical edge and horizontal edge, an L-shape which is the symbol position detection pattern in the data matrix is detected. A position of each module included in the symbol is detected on the basis of a position of the symbol position detection pattern, and the print quality of the symbol is measured on the basis of the position of each module.

In addition, a method for detecting the symbol position detection pattern when the symbol is the QR code is described below. FIGS. 9 and 10 show a method for detecting a symbol position detection pattern in a QR code specified by ISO/IEC 18044. With reference to these drawings, the method for detecting the symbol position detection pattern in the QR code is described below.

In the QR code, the symbol position detection pattern is a pattern with an element width ratio of 1:1:3:1:1 located at an upper left end, a lower left end, and an upper right end of the square symbol shown in FIG. 3(b).

First, the entire image is binarized conforming to the method described in ISO/IEC 14515. Next, as shown in FIG. 9, the entire image is scanned along the horizontal direction, and a position of a pattern having an element width ratio of dark:bright:dark:bright:dark=1:1:3:1:1 is identified. Next, as shown in FIG. 10, this time, the entire image is scanned along the vertical direction, and a position of a pattern having an element width ratio of dark:bright:dark:bright:dark=1:1:3:1:1 is identified. From the results of these scans in the horizontal and vertical directions, and from overlapping positions of the patterns having an element width ratio of dark:bright:dark:bright:dark=1:1:3:1:1, the symbol position detection pattern is detected.

The above method is a conventional method for detecting a symbol position detection pattern in a two-dimensional symbol.

For example, when reading (decoding) of the symbol and evaluation of the print quality of the symbol are performed on a product production line, after the symbol is read (decoded), the print quality is evaluated again in accordance with the method specified by ISO/IEC. In this case, a reference position of the symbol position detection pattern is required to be re-identified again. However, this processing takes time.

Thus, in an example of the embodiment of the present invention, when the symbol is successfully read (decoded), because position information about the symbol position detection pattern is once identified, the processing time required for identification of the position of each module is reduced by using the identified position information about the symbol position detection pattern. In addition, because the method specified by ISO/IEC can be partially used for the evaluation of the print quality, an evaluation result of the print quality of the symbol that is highly correlated with a measurement result of the print quality evaluated using the method specified by ISO/IEC 15415 can be obtained.

FIG. 6 is a diagram illustrating a position detection (correction) method of a position detection pattern of a data matrix according to one embodiment of the present invention. Hereinafter, the method for detecting a symbol position detection pattern in one embodiment of the present invention is described.

In the embodiment, for example, as shown in FIG. 6(a), regions A, B, and C that include modules located at a corner (B) and end portions (A, C) of the detected L-shaped symbol position detection pattern and surrounding modules thereof are identified as a partial region. FIGS. 6(b) to 6(d) are diagrams showing a method for detecting the position of the symbol position detection pattern. The method for detecting the position of the symbol position detection pattern in the embodiment is described with reference to FIG. 6.

First, on the basis of information of the L-shaped position detection pattern that has already been detected, the regions A, B, and C including the modules around an upper left vertex, a lower left vertex, and a lower right vertex of a square of a data matrix symbol shown in FIG. 6(a) are identified as a partial region. Only the region identified above in the image including the symbol is binarized.

Next, as shown in FIGS. 6(b) to 6(d), boundary points a2, b21, b22, and c2 on edges of the modules corresponding to the end or the corner of the symbol position detection pattern are identified, and the edges are traced from the boundary points, to identify a reference position of the symbol position detection pattern corresponding to the corner of the symbol.

For example, center points a1, b1, and c1 of the modules corresponding to the end or the corner of the L-shaped position detection pattern that has been already detected are identified, color change points are detected from the inner side to the outer side of the symbol, and the boundary points a2, b21, b22, and c2 on the edges of the modules are identified. By tracing the edges from the boundary points, end points a3, b31, b32, and c3 of each side are identified. An intersection b4 of a straight line connecting a3 and b31 and a straight line connecting b32 and c3 can be obtained, and the L-shaped symbol position detection pattern can be detected from a3, b4, and c3.

In addition, in the present invention, in order to detect the position of the center of the module, a position of a module position detection pattern may be detected in addition to the symbol position detection pattern. Here, as shown in FIGS. 7 and 8, the module position detection pattern is a pattern in which white modules and black modules located on upper and right sides of a square symbol are alternately arranged, that is, a timing pattern which is a pattern having an element width ratio of 1:1. In this case as well, regions of the module position detection pattern including a plurality of modules may be identified as a partial region, and only the partial region may be binarized to obtain the center of each module. Here, the element means a set of modules of the same color adjacent to each other.

As described above, if the position information of the symbol position detection pattern or the position information of the module position detection pattern is detected, a plurality of module positions included in the symbol are identified on the basis of these pieces of position information, and the quality of the symbol is evaluated on the basis of the plurality of module positions identified above.

Thus, according to the above embodiment, the time required for evaluating the print quality of the symbol can be shortened, and a result having a high correlation with a verification result obtained by a verifier conforming to ISO/IEC 15415 can be obtained.

The method for evaluating the print quality of the data matrix in the two-dimensional symbols has been described above. However, the present invention is not limited to the above embodiment, and can be applied to other two-dimensional symbols such as a QR code, a dot code, and the like, one-dimensional symbols (bar codes), or the like.

§ 2 Configuration Example

Symbol Reading Device 1

Figure 1:
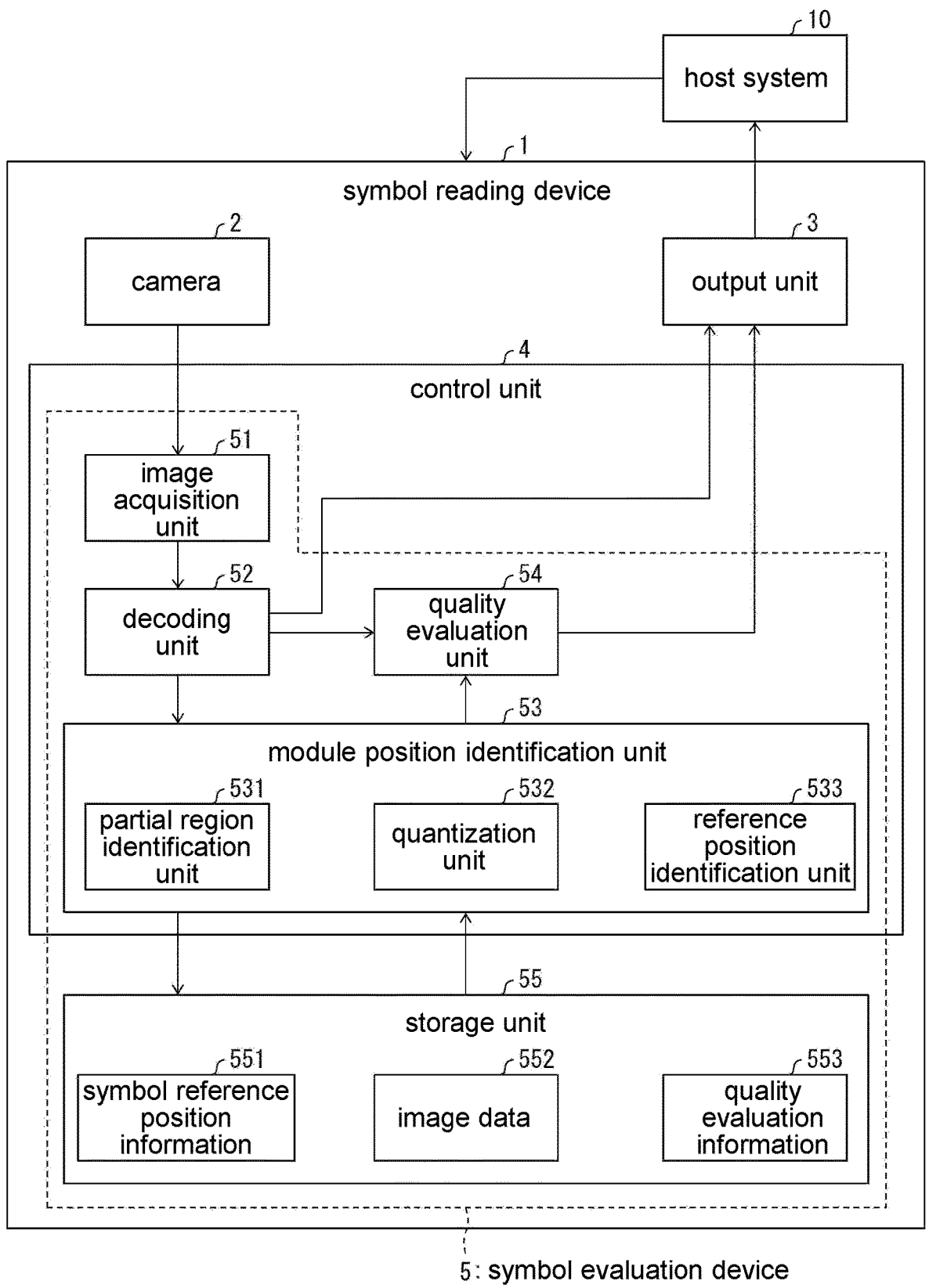
FIG. 1 is a block diagram showing an example of a main configuration of a symbol reading device including a symbol evaluation device according to an embodiment of the present invention.

FIG. 1 is a block diagram showing an example of a main configuration of a symbol reading device 1 including a symbol evaluation device 5 according to the embodiment. In the embodiment, an example in which the symbol evaluation device 5 is integrated with the symbol reading device 1 is shown, but the symbol evaluation device 5 may be separated from the symbol reading device 1. In addition, in the symbol evaluation device 5 of the embodiment, for example, symbol reading and the print quality of the symbol are evaluated for the data matrix or QR code which is a two-dimensional symbol.

As shown in FIG. 1, the symbol reading device 1 includes a camera 2, an output unit 3, a control unit 4, and a storage unit 55. In addition, the symbol evaluation device 5 includes the control unit 4 and the storage unit 55.

Camera 2

The camera 2 photographs a symbol. The camera 2 outputs image data including the photographed symbol to an image acquisition unit 51.

Control Unit 4

The control unit 4 includes a central processing unit (CPU), a random access memory (RAM), a read only memory (ROM), and the like, and controls each constituent element according to information processing. The control unit 4 includes the image acquisition unit 51, a decoding unit 52, a module position identification unit 53, and a quality evaluation unit 54.

Image Acquisition Unit 51

The image acquisition unit 51 acquires image data 552 which is obtained by photographing the symbol and is output from the camera 2, and outputs the image data 552 to the decoding unit 52.

Decoding Unit 52

The decoding unit 52 decodes the symbol included in the image. A method for decoding the symbol is not particularly limited as long as a known technique is appropriately used. The decoding unit 52 outputs a signal indicating information included in the decoded symbol to a higher-order system 10 via the output unit 3.

The higher-order system 10 is, for example, a personal computer or a programmable controller (PLC), which controls an operation of the symbol reading device 1.

In addition, the decoding unit 52 identifies reference position information of the symbol in the image in a process of decoding the symbol included in the image.

The reference position information of the symbol includes position information of the symbol position detection pattern or position information of the module position detection pattern determined for each type of symbols. Here, the position information of the symbol position detection pattern refers to information indicating a range of the position detection pattern. For example, in the data matrix, the position information of the symbol position detection pattern includes information of the center positions of the modules corresponding to the end and the corner of the L-shaped symbol position detection pattern, and in the QR code, the position information of the symbol position detection pattern includes information of the center positions of the center modules included in the position detection pattern located at three corners.

In addition, here, the module refers to a basic unit constituting a symbol. The position information of the module position detection pattern is information indicating a range of the module position detection pattern. For example, in the data matrix, the position information of the module position detection pattern includes information of center positions of modules corresponding to the end and the corner of a pattern in which the white modules and the black modules at positions facing the L-shaped symbol position detection pattern are alternately arranged (hereinafter, also referred to as a timing pattern). In addition, in the QR code, the position information of the module position detection pattern includes information of a center position of a center module included in an alignment pattern (D1) shown in FIG. 3, and information of center positions of modules included in timing patterns (C1, C2).

The decoding unit 52 stores reference position information 551 of the symbol that has been identified in the storage unit 55. In addition, the decoding unit 52 outputs a signal indicating the reference position of the symbol to the module position identification unit 53.

In addition, the decoding unit 52 stores the image data 552 which is obtained by photographing the symbol in the storage unit 55.

Module Position Identification Unit 53

The module position identification unit 53 identifies a plurality of module positions included in the symbol on the basis of the reference position information 551 of the symbol identified by the decoding unit 52. For example, the module position identification unit 53 identifies the plurality of module positions included in the symbol on the basis of the position information of the symbol position detection pattern or the position information of the module position detection pattern.

For example, the module position identification unit 53 includes a partial region identification unit 531, a quantization unit 532, and a reference position identification unit 533. The partial region identification unit 531 identifies a partial region including modules that constitute at least a part of the symbol position detection pattern or the module position detection pattern in the image on the basis of the position information of the symbol position detection pattern or the position information of the module position detection pattern. The quantization unit 532 quantizes a partial region.

In addition, the quantization unit 532 may binarize a monochrome image or quantize a color image. Here, in the image processing, the quantization is color quantization or color image quantization, which makes an image look as identical as possible to the original image and reduces the number of different colors used in the image. That is, for a color image, the quantization is color reduction processing in which one pixel is assigned any of N values (N is an integer greater than or equal to 2 and smaller than the number of gradations of the image) less than the number of gradations of the original image according to the color of each pixel. For example, the quantization unit 532 may binarize or quaternize a color image represented by 255 gradations×3 colors.

The reference position identification unit 533 identifies a pattern reference position of the symbol position detection pattern or the module position detection pattern. The module position identification unit 53 identifies the plurality of module positions included in the symbol on the basis of the pattern reference position. Details are described later.

For example, when the symbol is a data matrix or the like, the partial region may include a module corresponding to an end or a corner of the L-shaped symbol position detection pattern and a periphery of this module, and the pattern reference position may be a position corresponding to the corner of the symbol.

The reference position identification unit 533 may identify a boundary point on an edge of the module corresponding to the end or the corner of the symbol position detection pattern, and trace the edge from the boundary point to identify the pattern reference position corresponding to the corner of the symbol.

In addition, the partial region may include the symbol position detection pattern and a periphery of the symbol position detection pattern, and the pattern reference position may be a center of the symbol position detection pattern.

In addition, for example, when the symbol is a QR code or the like, the reference position identification unit 533 may identify a first center line in a range where an element width changes at a predetermined ratio in a first direction (horizontal direction), identify a second center line in a range where an element width changes at a predetermined ratio in a second direction (vertical direction), and identify an intersection of the first center line and the second center line as the pattern reference position.

The symbol position detection pattern may be an L-shape.

In addition, for example, when the symbol is a QR code or the like, the symbol position detection pattern may be a pattern having an element width ratio of 1:1:3:1:1.

The module position detection pattern may be a pattern having an element width ratio of 1:1.

Quality Evaluation Unit 54

The quality evaluation unit 54 evaluates the quality of the symbol on the basis of the plurality of module positions identified by the module position identification unit 53. Quality evaluation information 553 is stored in the storage unit 55 as a result.

Output Unit 3

The output unit 3 outputs a signal to an external device. Particularly, in the embodiment, the decoding unit 52 outputs a signal indicating the information included in the decoded symbol to the higher-order system 10.

Storage Unit 55

The storage unit 55 is, for example, an auxiliary storage device such as a flash memory, a solid state drive, or the like, and stores the symbol reference position information 551, the image data 552, the quality evaluation information 553, and the like.

According to the above configuration, when the print quality of the symbol is evaluated after the two-dimensional symbol is read (decoded), the symbol position detection pattern or the module position detection pattern once decoded is used to set the regions including the modules located at the end portions of those patterns is set as a partial region, only the region is binarized, and the pattern reference position of the symbol position detection pattern or the module position detection pattern is identified by a method according to a predetermined quality index calculation standard, and therefore the processing time can be shortened. Moreover, because the quality measurement method according to ISO/IEC is partially used, a measurement result having a high correlation with a verification result obtained by a verifier that implements the quality measurement method according to a regulation of ISO/IEC can be obtained.

§ 3 Operation Example

Reference Example

FIG. 16 is a flowchart illustrating a flow of processing of reading the symbol and subsequently evaluating the print quality of the symbol, which is executed by a conventional symbol reading device. First, with reference to FIG. 16, operations of reading the symbol and subsequently evaluating the print quality of the symbol in the conventional symbol reading device are described.

Step S110

First, in step S110, the image acquisition unit captures an image of the symbol photographed by the camera. The image data is captured into the storage unit.

Step S112

Next, in step S112, the decoding unit decodes the symbol included in the captured image. The decoded information may also be stored in the storage unit.

As described above, when the symbol is successfully read, the print quality of the symbol is evaluated as follows.

Step S114

In step S114, the entire image is binarized according to the method described in ISO/IEC 15415, and as shown in FIGS. 4 and 5, a position of the symbol position detection pattern is identified according to the method described in ISO/IEC corresponding to the symbol.

FIGS. 4 and 5 show a method for detecting a symbol position detection pattern in a data matrix specified by ISO/IEC 16022. With reference to these drawings, the method for detecting the symbol position detection pattern in the data matrix is described below.

First, the entire symbol is binarized using the method specified by ISO/IEC 15415. Next, as shown in FIG. 4, a center of the symbol is scanned in the horizontal direction to detect color change points (white to black, and black to white), and an edge is traced. Next, as shown in FIG. 5, this time, the center of the symbol is scanned in the vertical direction to detect color change points (white to black, and black to white), and an edge is traced. Then, on the basis of a combination of the detected vertical edge and horizontal edge, an L-shape which is the symbol position detection pattern in the data matrix is detected.

In addition, when the two-dimensional symbol is a QR code, processing in step S114 is as follows.

In the QR code, the symbol position detection pattern is a pattern with an element width ratio of 1:1:3:1:1 located at an upper left end, a lower left end, and an upper right end of the square symbol shown in FIG. 3(*b*).

FIGS. 9 and 10 show a method for detecting a symbol position detection pattern in a QR code specified by ISO/IEC 18044. With reference to these drawings, the method for detecting the symbol position detection pattern in the QR code is described below.

First, the entire image is binarized conforming to the method described in ISO/IEC 14515. Next, as shown in FIG. 9, the entire image is scanned along the horizontal direction, and a position of a pattern having an element width ratio of dark:bright:dark:bright:dark=1:1:3:1:1 is identified.

The position of the module position detection pattern is identified from the position information of the detected symbol position detection pattern. In a case of the data matrix, a position of the timing pattern is obtained by the method described in ISO/IEC 16022 on the basis of the detected L-shape. In a case of the QR code, the positions of the alignment pattern and the timing pattern are identified by the method described in ISO/IEC 18044 on the basis of a positional relationship of the detected three symbol position detection patterns.

The alignment pattern serving as the module position detection pattern in the QR code may be detected. The module position detection pattern is a pattern (the alignment pattern D1), in which modules of dark:bright:dark:bright:dark are lined up in the horizontal and vertical directions, located at the lower right of the center of the symbol shown in FIG. 3(*b*). The module position detection pattern has an element width ratio of light:dark:light=1:1:1 in the horizontal and vertical directions.

In addition, the timing pattern serving as the module position detection pattern in the QR code may be detected. The timing pattern is a pattern having an element width ratio of 1:1. Specifically, the timing pattern includes the patterns C1 and C2 in which the white modules and the black modules are alternately arranged as shown in FIG. 3(*b*).

As described above, the plurality of module positions included in the symbol are identified on the basis of the position information of the symbol position detection pattern or the position information of the module position detection pattern.

Step S116

Next, in step S116, on the basis of the position information of the symbol position detection pattern or the module position detection pattern detected in S114, the grid is estimated, that is, the position of each module is detected for all the modules included in the symbol.

Step S118

Next, in step S118, the print quality of the symbol is calculated according to the method described in ISO/IEC 15415.

Embodiment 1

Figure 2:
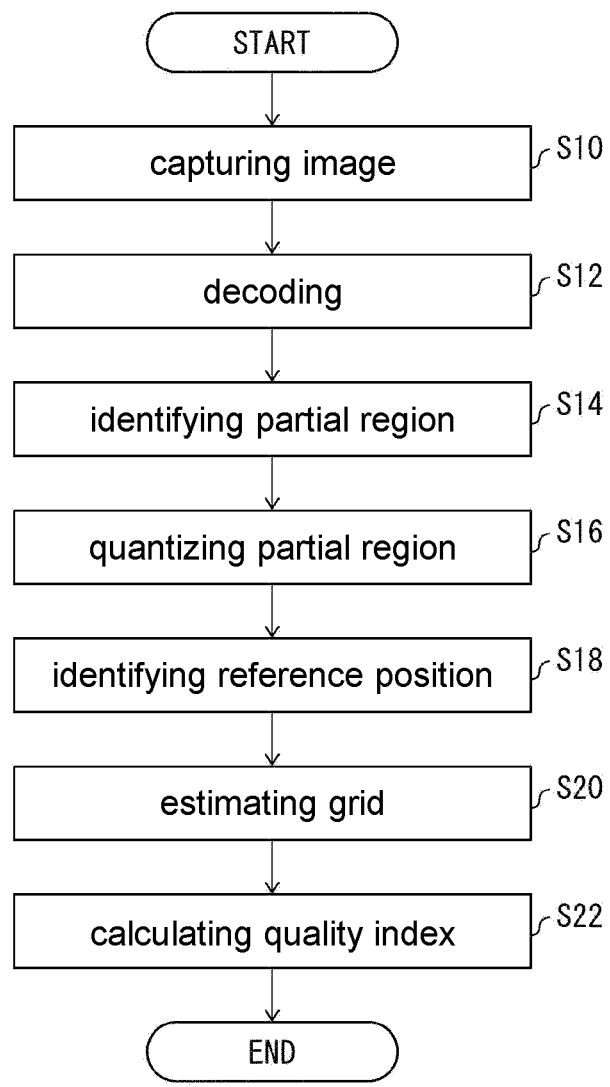
FIG. 2 is a flowchart showing an example of a flow of processing in symbol evaluation according to the embodiment of the present invention.

On the other hand, FIG. 2 is a flowchart illustrating a flow of processing of reading the symbol and subsequently evaluating the print quality of the symbol, which is executed by the symbol reading device 1 of the embodiment. Hereinafter, with reference to FIG. 2, the flow of processing of reading the symbol and subsequently evaluating the print quality of the symbol in the embodiment is described. Here, a case where the symbol is the data matrix as shown in FIG. 3(*a*) is described.

Step S10

First, in step S10, the image acquisition unit 51 captures data of an image including the symbol photographed by the camera 2. The image data 552 is captured into the storage unit 55.

Step S12

Next, in step S12, the decoding unit 52 decodes the symbol included in the captured image data 552. The decoding unit 52 identifies the reference position information of the symbol in a decoding process. The decoded information may also be stored in the storage unit 55. The reference position information of the symbol includes the position information of the symbol position detection pattern or the position information of the module position detection pattern determined for each type of symbols. In the data matrix, the symbol position detection pattern is an L-shape A1 consisting of a lower side and a left side of a square symbol shown in FIG. 3(*a*), and the module position detection pattern is a pattern E1 having an element width ratio of 1:1 and consisting of an upper side and a right side of a square symbol shown in FIG. 8.

Step S14

In step S14, the module position identification unit 53 acquires the position information of the symbol position detection pattern and the position information of the module position detection pattern from the decoding unit 52. The partial region identification unit 531 in the module position identification unit 53 identifies a partial region including modules that constitute at least a part of the symbol position detection pattern in the image on the basis of the position information of the symbol position detection pattern acquired from the decoding unit 52. For example, the partial region includes the symbol position detection pattern and the periphery of the symbol position detection pattern. The position information of the symbol position detection pattern includes, for example, information about the center positions of the modules located at the corner and the end of the L-shaped symbol position detection pattern.

Here, with reference to FIG. 6, the identification of the partial region including modules that constitute at least a part of the symbol position detection pattern when the symbol is the data matrix is described in detail.

In the embodiment, the partial region includes modules that constitute a part of the symbol position detection pattern and the module position detection pattern. For example, FIG. 6(*a*) shows an example of a partial region including modules that constitute a part of the symbol position detection pattern. The partial region identification unit 531 acquires the position information (the center positions) of the modules corresponding to the end or the corner of the L-shaped symbol position detection pattern and module size information from the decoding unit 52, and sets a region including the modules and the peripheries thereof. Here, the partial region includes the modules corresponding to the end or the corner of the L-shaped symbol position detection pattern and the peripheries of the modules. For example, as shown in FIG. 6, the partial region may include the modules corresponding to the corner B, the end A, and the end C of the L-shaped symbol position detection pattern, and the peripheries of the modules.

The partial region identification unit 531 in the module position identification unit 53 may further identify a partial region including modules that constitute at least a part of the module position detection pattern on the basis of the position information of the module position detection pattern.

FIG. 8 shows the identification of a partial region including modules that constitute at least a part of the module position detection pattern.

The partial region includes a module corresponding to a corner of an inverted L-shaped timing pattern consisting of an upper side and a right side of a square symbol, and surrounding modules thereof.

Thus, in the embodiment, the partial region includes the modules corresponding to the corner B, the end A, and the end C of the L-shaped symbol position detection pattern shown in FIG. 6(*a*), and the peripheries of the modules. Furthermore, in the partial region, positions (center positions) and module sizes of modules at both ends of the timing pattern are acquired from the decoding unit 52, and the module corresponding to the corner of the inverted L-shaped timing pattern consisting of the upper side and the right side of the square symbol shown in FIG. 8 and the surrounding modules thereof are included.

Step S16

Next, in step S16, the quantization unit 532 quantizes (binarizes) the identified partial regions A, B, and C. When the partial region includes E1, E1 is also quantized (binarized).

Step S18

Next, in step S18, the reference position identification unit 533 partially uses a method according to a predetermined quality index calculation standard, to identify the pattern reference position of the symbol position detection pattern or the module position detection pattern in a quantized image of the partial region. Here, the pattern reference position of the symbol position detection pattern is a position corresponding to the corner of the symbol. On the basis of the information acquired from the decoding unit 52, the pattern reference position of the module position detection pattern is a center position of the module corresponding to the end or the corner of the module position detection pattern shown in FIG. 8, or a central position of each module included in the module position detection pattern.

The reference position identification unit 533 identifies a boundary point on an edge of the module corresponding to the end or the corner of the symbol position detection pattern on the basis of the center position of the module corresponding to the end or the corner of the symbol position detection pattern, and traces the edge from the boundary point to identify the pattern reference position corresponding to the corner of the symbol. FIGS. 6(*b*) to 6(*d*) show specific examples of a method for identifying the position corresponding to the corner of the symbol. FIGS. 6(*b*) to 6(*d*) show the identified partial regions A, B, and C, respectively. In FIG. 6(*b*), the center points a1, b1, and c1 of the modules corresponding to the end or the corner of the L-shaped symbol position detection pattern that has already been detected are identified, color change points are detected from the inner side to the outer side of the symbol, and the boundary points a2, b21, b22, and c2 on the edges of the modules are identified. By tracing the edges from the boundary points a2, b21, b22 and c2, the end points a3, b31, b32 and c3 of each side are identified. The intersection b4 of the straight line connecting a3 and b31 and the straight line connecting b32 and c3 can be obtained, and the L-shaped symbol position detection pattern can be detected from a3, b4 and c3.

For example, as processing of tracing the edge of the L-shape to identify the corner of the symbol, although starting points are different, a method specified by ISO/IEC can be partially used.

Moreover, the module position identification unit 53 (the partial region identification unit 531, the quantization unit 532, and the reference position identification unit 533) may identify the pattern reference position of the module position detection pattern on the basis of the pattern reference position of the symbol position detection pattern identified by the reference position identification unit 533.

Step S20

Next, in step S20, the grid is estimated. That is, the module position identification unit 53 identifies a plurality of module positions (a center position of each module) included in the symbol on the basis of the pattern reference position of the symbol position detection pattern or the pattern reference position of the module position detection pattern.

Step S22

Next, in step S22, the quality evaluation unit 54 evaluates the print quality of the symbol on the basis of the plurality of module positions identified by the module position identification unit 53. For example, as processing of evaluating the print quality, a method specified by ISO/IEC can be partially used.

According to the symbol evaluation device 5 according to the above embodiment, only the partial region including the modules located at the corner and the end of the L-shape and the surrounding modules thereof is binarized on the basis of the position information of the symbol position detection pattern identified at the time of reading the symbol, and the plurality of module positions included in the symbol are identified on the basis of the information to evaluate the print quality, and therefore the symbol print quality in the data matrix can be measured at a high speed. Moreover, because a quality measurement method conforming to ISO/IEC is partially used, a measurement result having a high correlation with a print quality evaluation result obtained by a verifier conforming to ISO/IEC can be obtained.

Embodiment 2

In Embodiment 2, a case where the print quality of the QR code as a two-dimensional symbol is evaluated is described. In the embodiment, only steps different from those in Embodiment 1 are described.

Step S10

Step S10 is the same as step S10 of Embodiment 1.

Step S12

Step S12 is also basically the same as step S10 of Embodiment 1, and the decoding unit 52 identifies the reference position information of the symbol in a process of decoding the symbol included in the captured image. The decoded information may also be stored in the storage unit 55. The reference position information of the symbol includes the position information of the symbol position detection pattern or the position information of the module position detection pattern determined for each type of symbols.

Because the method for detecting the symbol position detection pattern and the module position detection pattern in the QR code is as described in detail in step S114 of the above reference example, repeated descriptions are omitted here.

Step S14

In step S14, the partial region identification unit 531 in the module position identification unit 53 identifies a partial region including modules that constitute the symbol position detection pattern in the image on the basis of the position information of the symbol position detection pattern. For example, the partial region includes the symbol position detection pattern and the periphery of the symbol position detection pattern.

In the embodiment, the modules that constitute a part of the symbol position detection pattern are included. For example, FIGS. 11 and 12 show an example of a partial region including modules that constitute a part of the symbol position detection pattern. Here, a region including modules that constitute the symbol position detection pattern located at an upper left corner B1, a lower left corner B2, and an upper right corner B3 of a square symbol and the peripheries of the modules are identified as the partial region. That is, in the QR code, the position information of the symbol position detection pattern is a center position of each module at four corners of the symbol position detection pattern. The partial region is identified on the basis of the position information of the symbol position detection pattern.

In step S14, the partial region identification unit 531 may further identify a region D1 including modules that constitute at least a part of the module position detection pattern in the image as the partial region on the basis of the position information of the module position detection pattern (the alignment pattern). In addition, the partial region identification unit 531 may identify regions C1 and C2 including modules that constitute the timing pattern in the image as the partial region on the basis of the position information of the timing pattern.

Step S16

Next, in step S16, the quantization unit 532 quantizes (binarizes) the identified partial regions B1, B2, and B3. Alternatively, the module position detection pattern D1 or the timing pattern may also be quantized (binarized).

Step S18

Next, in step S18, the reference position identification unit 533 identifies the pattern reference position of the symbol position detection pattern in a quantized image of the partial region by a method according to a predetermined quality index calculation standard. Here, the pattern reference position may be a center of the symbol position detection pattern. Thus, the reference position identification unit 533 identifies a first center line in a range where an element width changes at a predetermined ratio in a first direction, identifies a second center line in a range where an element width changes at a predetermined ratio in a second direction, and identifies an intersection of the first center line and the second center line as the pattern reference position.

FIG. 13 shows a method for identifying the pattern reference position in the embodiment. As shown in FIG. 13, in the embodiment, a center line of a range where the element width changes at a ratio of 1:1:3:1:1 in the horizontal direction of the partial regions B1 to B3 is identified, a center line of a range where the element width changes at a ratio of 1:1:3:1:1 in the vertical direction of the partial region is identified, and an intersection of the two center lines is identified as the reference position of the symbol position detection pattern.

Furthermore, a center line of a range where the element width changes at a ratio of 1:1:1 in the partial region D1 is identified, a center line of a range where the element width changes at a ratio of 1:1:1 in the vertical direction of the partial region is identified, and an intersection of the two center lines is identified as the reference position of the module position detection pattern.

Step S20

Next, in step S20, the grid is estimated. That is, the module position identification unit 53 identifies a plurality of module positions included in the symbol on the basis of the reference position of the symbol position detection pattern (the center position of each symbol position detection pattern) or the pattern reference position of the module position detection pattern (the center position of the module position detection pattern). For example, as processing of identifying each module position included in the symbol from the center position of each symbol position detection pattern and the center position of the module position detection pattern, a method specified by ISO/IEC can be partially used.

Step S22

Next, in step S22, the quality evaluation unit 54 evaluates the print quality of the symbol on the basis of the plurality of module positions identified by the module position identification unit 53.

According to the symbol evaluation device 5 according to the above embodiment, only the partial region including the symbol position detection pattern located at three corners of the QR code is binarized on the basis of the position information of the symbol position detection pattern identified in a process of decoding the symbol by the decoding unit 52, and a plurality of module positions included in the symbol are identified on the basis of the information to measure the print quality. Therefore, the symbol print quality in the QR code can be measured at a high speed, and because a quality measurement method conforming to ISO/IEC is partially used, a measurement result having a high correlation with a print quality evaluation result obtained by a verifier conforming to ISO/IEC can be obtained.

According to the above configuration, the symbol print quality of the two-dimensional symbol can be measured at a high speed, and a measurement result having a high correlation with a print quality evaluation result obtained by a verifier conforming to ISO/IEC can be obtained.

Embodiment 3

The present invention can also be applied to two-dimensional symbols other than the data matrix and the QR code described above. For example, the present invention can also be applied to a two-dimensional symbol in which no specific symbol position detection pattern exists, such as a dot code shown in FIG. 14.

In the dot code, in a process of decoding the symbol, the reference position information of the symbol, for example, a position of an initial printed dot (preferably around a center of the symbol) from which the search is started, directions (d1, d2) in which each dot from this dot is lined up, and a search range A can be identified. Then, the position of each dot included in the symbol can be identified on the basis of these pieces of symbol reference position information, and the quality of the symbol can be evaluated on the basis of the position of each dot that has been identified. Therefore, by applying the present invention in the dot code, the symbol print quality can also be measured at a high speed, and because a quality measurement method conforming to ISO/IEC is partially used, a measurement result having a high correlation with a print quality evaluation result obtained by a verifier conforming to ISO/IEC can also be obtained.

Embodiment 4

In the above Embodiments 1 to 3, the print quality evaluation of the two-dimensional symbol has been described. The print quality evaluation of the present invention is not limited thereto, and can also be applied to, for example, the print quality evaluation of a one-dimensional symbol (bar code) as shown in FIG. 15.

As shown in FIG. 15, in the one-dimensional symbol, a start pattern 15 and a stop pattern 16 exist at positions adjacent to quiet zones 14 located at left and right ends of a symbol region. In the one-dimensional symbol, the decoding unit 52 identifies the reference position information of the symbol, for example, regions located at four corners of the symbol including upper and lower ends of the start pattern 15 and upper and lower ends of the stop pattern in a process of decoding the symbol. Then, on the basis of these pieces of symbol reference position information, the module position identification unit 53 identifies the position of each module included in the symbol. The quality evaluation unit 54 can evaluate the quality of the symbol on the basis of the position of each module that has been identified. Therefore, by applying the present invention in the one-dimensional symbol, the symbol print quality can also be measured at a high speed, and because a quality measurement method conforming to ISO/IEC is partially used, a measurement result having a high correlation with a print quality evaluation result obtained by a verifier conforming to ISO/IEC can also be obtained.

In addition, also for a multi-layered one-dimensional symbol or multi-row type two-dimensional symbol, a peripheral region including upper and lower ends of a start pattern and a stop pattern of each stage is set as a partial region and only the partial region is binarized to identify the position of the symbol, and thereby the processing time of the print quality evaluation can be shortened and a measurement result having a high correlation with a print quality evaluation result obtained by a verifier conforming to ISO/IEC can be obtained.

Implementation Example by Software

A control block (control unit 4) of the symbol evaluation device 5 (particularly, the decoding unit 52, the module position identification unit 53, and the quality evaluation unit 54) may be realized by a logic circuit (hardware) formed in an integrated circuit (IC chip) or the like, or may be realized by software.

In the latter case, the symbol evaluation device 5 includes a computer that executes an instruction of a program which is software that realizes each function. The computer includes, for example, one or more processors and a computer-readable recording medium that stores the program. Then, in the computer, the processor reads the program from the recording medium and executes the program, and thereby an objective of the present invention is achieved. As the processor, for example, a central processing unit (CPU) can be used. As the recording medium, a "non-temporary tangible medium", for example, in addition to a read only memory (ROM) or the like, a tape, a disk, a card, a semiconductor memory, a programmable logic circuit, or the like can be used. In addition, a random access memory (RAM) for developing the program, or the like may be further included. In addition, the program may be supplied to the computer via an arbitrary transmission medium (a communication network, a broadcast wave, or the like) capable of transmitting the program. Moreover, one aspect of the present invention can also be realized in the form of a data signal embedded in a carrier wave, in which the program is embodied by electronic transmission.

Summary

In order to solve the above problems, a symbol evaluation device according to one aspect of the present invention includes: a decoding unit that decodes a symbol included in an image and thereby identifies reference position information of the symbol; a module position identification unit that identifies a plurality of module positions included in the symbol on the basis of the reference position information of the symbol identified by the decoding unit; and a quality evaluation unit that evaluates the quality of the symbol on the basis of the plurality of module positions identified by the module position identification unit.

In addition, a symbol evaluation method according to one aspect of the present invention includes: a decoding step of decoding a symbol included in an image and thereby identifying reference position information of the symbol; a module position identification step of identifying a plurality of module positions included in the symbol on the basis of the reference position information of the symbol identified in the decoding step; and a quality evaluation step of evaluating the quality of the symbol on the basis of the plurality of module positions identified in the module position identification step.

According to the above configuration, on the basis of the reference position information of the symbol obtained by decoding the symbol, the plurality of module positions included in the symbol are identified, then the print quality of the symbol is measured, and therefore the processing time required for measuring the print quality of the symbol can be shortened. In addition, for example, because a quality measurement method according to a regulation of ISO/IEC 15415 can be partially used, a result having a correlation with a verification result obtained by a verifier conforming to ISO/IEC 15415 can be obtained.

In the symbol evaluation device according to one aspect of the present invention, the reference position information of the symbol may include position information of a symbol position detection pattern or position information of a module position detection pattern determined for each type of symbols, and the module position identification unit may identify the plurality of module positions included in the symbol on the basis of the position information of the symbol position detection pattern or the position information of the module position detection pattern.

According to the above configuration, for the symbols having different symbol types, the plurality of module positions included in the symbol are identified using the position information of the symbol position detection pattern or the position information of the module position detection pattern determined for each type of the symbols, and thus the processing time required for evaluating the print quality of the symbol can be shortened.

In the symbol evaluation device according to one aspect of the present invention, the module position identification unit may include: a partial region identification unit that identifies a partial region including modules that constitute at least a part of the symbol position detection pattern or the module position detection pattern in the image on the basis of the position information of the symbol position detection pattern or the position information of the module position detection pattern; a quantization unit that quantizes a brightness value or color of the partial region; and a reference position identification unit that identifies a pattern reference position of the symbol position detection pattern or the module position detection pattern by a method according to a predetermined quality index calculation standard in a quantized image of the partial region. The module position identification unit may identify the plurality of module positions included in the symbol on the basis of the pattern reference position.

According to the above configuration, because only the module in the identified partial region is quantized and the pattern reference position information of the symbol position detection pattern or the module position detection pattern is identified, the processing time required for evaluating the print quality of the symbol can be shortened.

In the symbol evaluation device according to one aspect of the present invention, the quantization unit may binarize a monochrome image or quantize a color image.

According to the above configuration, only the module in the identified partial region is binarized in the monochrome image, or the color image is quantized. Thereby, the pattern reference position information of the symbol position detection pattern or the module position detection pattern is identified, and thus the processing time required for evaluating the print quality of the symbol can be shortened.

In the symbol evaluation device according to one aspect of the present invention, the partial region may include a module corresponding to an end or a corner of the L-shaped symbol position detection pattern and a periphery of the module, and the pattern reference position may be a position corresponding to the corner of the symbol.

According to the above configuration, for example, in a symbol such as a data matrix or the like, the processing time required for evaluating the print quality of the symbol can be shortened.

In the symbol evaluation device according to one aspect of the present invention, the reference position identification unit may identify a boundary point on an edge of the module corresponding to the end or corner of the symbol position detection pattern, and trace the edge from the boundary point to identify the pattern reference position corresponding to the corner of the symbol.

According to the above configuration, the processing time required for evaluating the print quality of the symbol can be shortened, and because a quality measurement method according to a regulation of ISO/IEC 15415 is partially used, a result having a high correlation with a verification result obtained by a verifier conforming to ISO/IEC 15415 can be obtained.

In the symbol evaluation device according to one aspect of the present invention, the partial region may include the symbol position detection pattern and a periphery of the symbol position detection pattern, and the pattern reference position may be a center of the symbol position detection pattern.

According to the above configuration, the processing time required for evaluating the print quality of the symbol can be shortened.

In the symbol evaluation device according to one aspect of the present invention, the reference position identification unit may identify a first center line in a range where an element width changes at a predetermined ratio in a first direction, identify a second center line in a range where an element width changes at a predetermined ratio in a second direction, and identify an intersection of the first center line and the second center line as the pattern reference position.

According to the above configuration, for example, in the QR code, because only the peripheral partial region including the symbol position detection pattern is binarized and the center point of the partial region can be easily obtained, the processing time required for evaluating the print quality of the symbol can be shortened, and because a quality measurement method according to a regulation of ISO/IEC 15415 is partially used, a result having a high correlation with a verification result obtained by a verifier conforming to ISO/IEC 15415 can be obtained.

In the symbol evaluation device according to one aspect of the present invention, the symbol position detection pattern may be an L-shape.

According to the above configuration, the processing time required for evaluating the print quality of the symbol can be shortened.

In the symbol evaluation device according to one aspect of the present invention, the symbol position detection pattern may be a pattern having an element width ratio of 1:1:3:1:1.

According to the above configuration, for example, in the QR code, because only the periphery of the symbol position detection pattern located at three corners of the symbol is binarized as a partial region to identify the symbol position, the processing time required for evaluating the print quality of the symbol can be shortened, and because a quality measurement method according to a regulation of ISO/IEC 15415 is partially used, a result having a high correlation with a verification result obtained by a verifier conforming to ISO/IEC 15415 can be obtained.

In the symbol evaluation device according to one aspect of the present invention, the module position detection pattern may be a pattern having an element width ratio of 1:1.

According to the above configuration, in the two-dimensional symbol, because the symbol position is detected using the module position detection pattern in which light and dark modules are alternately arranged, the detection time of the symbol position can be shortened. Thus, the processing time required for evaluating the print quality of the symbol can also be shortened, and because a quality measurement method according to a regulation of ISO/IEC 15415 is partially used, a result having a high correlation with a verification result obtained by a verifier conforming to ISO/IEC 15415 can be obtained.

The present invention is not limited to each of the embodiments described above, various modifications can be made within the scope of the claims, and embodiments obtained by appropriately combining the technical means respectively disclosed in different embodiments are also included in the technical scope of the present invention.

REFERENCE SIGNS LIST 1 device
2 camera
3 output unit
4 control unit
5 symbol evaluation device
10 higher-order system
14 quiet zone
15 start pattern
16 stop pattern
51 image acquisition unit
52 decoding unit
53 module position identification unit
54 quality evaluation unit
55 storage unit
531 partial region identification unit
532 quantization unit
533 reference position identification unit
551 symbol position information
552 image data
553 quality evaluation information

What is claimed is:

1. A symbol evaluation device, comprising:
a processor, configured to:
  decode a symbol included in an image and thereby identifies reference position information of the symbol, wherein the reference position information of the symbol comprises position information of a symbol position detection pattern or position information of a module position detection pattern determined for each type of symbols;
  identify a plurality of module positions included in the symbol on the basis of the reference position information of the symbol comprising:
    identifying a partial region comprising modules that constitute at least a part of the symbol position detection pattern or the module position detection pattern in the image on the basis of the position information of the symbol position detection pattern or the position information of the module position detection pattern;
    identifying a pattern reference position of the symbol position detection pattern or the module position detection pattern according to the partial region,
    identifying the plurality of module positions included in the symbol on the basis of the pattern reference position; and
  evaluate a quality of the symbol on the basis of the plurality of module positions.

2. The symbol evaluation device according to claim 1, wherein the processor is further configured to:
  quantize a brightness value or color of the partial region, wherein the processor identifies the pattern reference position of the symbol position detection pattern or the module position detection pattern by a method according to a predetermined quality index calculation standard in a quantized image of the partial region, and
  wherein the processor identifies the plurality of module positions included in the symbol on the basis of the pattern reference position.

3. The symbol evaluation device according to claim 2, wherein the processor performs binarization of a monochrome image or quantization of a color image.

4. The symbol evaluation device according to claim 1, wherein the partial region comprises a module corresponding to an end or a corner of the L-shaped symbol position detection pattern and a periphery of the module; and
   the pattern reference position is a position corresponding to the corner of the symbol.

5. The symbol evaluation device according to claim 4, wherein the processor identifies a boundary point on an edge of the module corresponding to the end or corner of the symbol position detection pattern, and traces the edge from the boundary point to identify the pattern reference position corresponding to the corner of the symbol.

6. The symbol evaluation device according to claim 1, wherein the partial region comprises the symbol position detection pattern and a periphery of the symbol position detection pattern; and
   the pattern reference position is a center of the symbol position detection pattern.

7. The symbol evaluation device according to claim 6, wherein the processor
   identifies a first center line in a range where an element width changes at a predetermined ratio in a first direction,
   identifies a second center line in a range where an element width changes at a predetermined ratio in a second direction, and
   identifies an intersection of the first center line and the second center line as the pattern reference position.

8. The symbol evaluation device according to claim 1, wherein the symbol position detection pattern is an L-shape.

9. The symbol evaluation device according to claim 1, wherein the symbol position detection pattern is a pattern having an element width ratio of 1:1:3:1:1.

10. The symbol evaluation device according to claim 1, wherein the module position detection pattern is a pattern having an element width ratio of 1:1.

11. A symbol evaluation method, comprising:
   a decoding step of decoding a symbol included in an image and thereby identifying reference position information of the symbol, wherein the reference position information of the symbol comprises position information of a symbol position detection pattern or position information of a module position detection pattern determined for each type of symbols;
   a module position identification step of identifying a plurality of module positions included in the symbol on the basis of the reference position information of the symbol identified in the decoding step, wherein the module position identification step comprising:
      identifying a partial region comprising modules that constitute at least a part of the symbol position detection pattern or the module position detection pattern in the image on the basis of the position information of the symbol position detection pattern or the position information of the module position detection pattern;
      identifying a pattern reference position of the symbol position detection pattern or the module position detection pattern according to the partial region,
      identifying the plurality of module positions included in the symbol on the basis of the pattern reference position; and
   a quality evaluation step of evaluating the quality of the symbol on the basis of the plurality of module positions identified in the module position identification step.

12. The symbol evaluation device according to claim 3, wherein the partial region comprises a module corresponding to an end or a corner of the L-shaped symbol position detection pattern and a periphery of the module; and
   the pattern reference position is a position corresponding to the corner of the symbol.

13. The symbol evaluation device according to claim 3, wherein the partial region comprises the symbol position detection pattern and a periphery of the symbol position detection pattern; and
   the pattern reference position is a center of the symbol position detection pattern.

14. The symbol evaluation device according to claim 6, wherein the symbol position detection pattern is a pattern having an element width ratio of 1:1:3:1:1.

15. The symbol evaluation device according to claim 7, wherein the symbol position detection pattern is a pattern having an element width ratio of 1:1:3:1:1.

* * * * *